No. 736,868. PATENTED AUG. 18, 1903.
W. F. M. McCARTY.
PROCESS OF DECOMPOSING WATER BY ELECTROLYSIS.
APPLICATION FILED APR. 22, 1902.
NO MODEL.
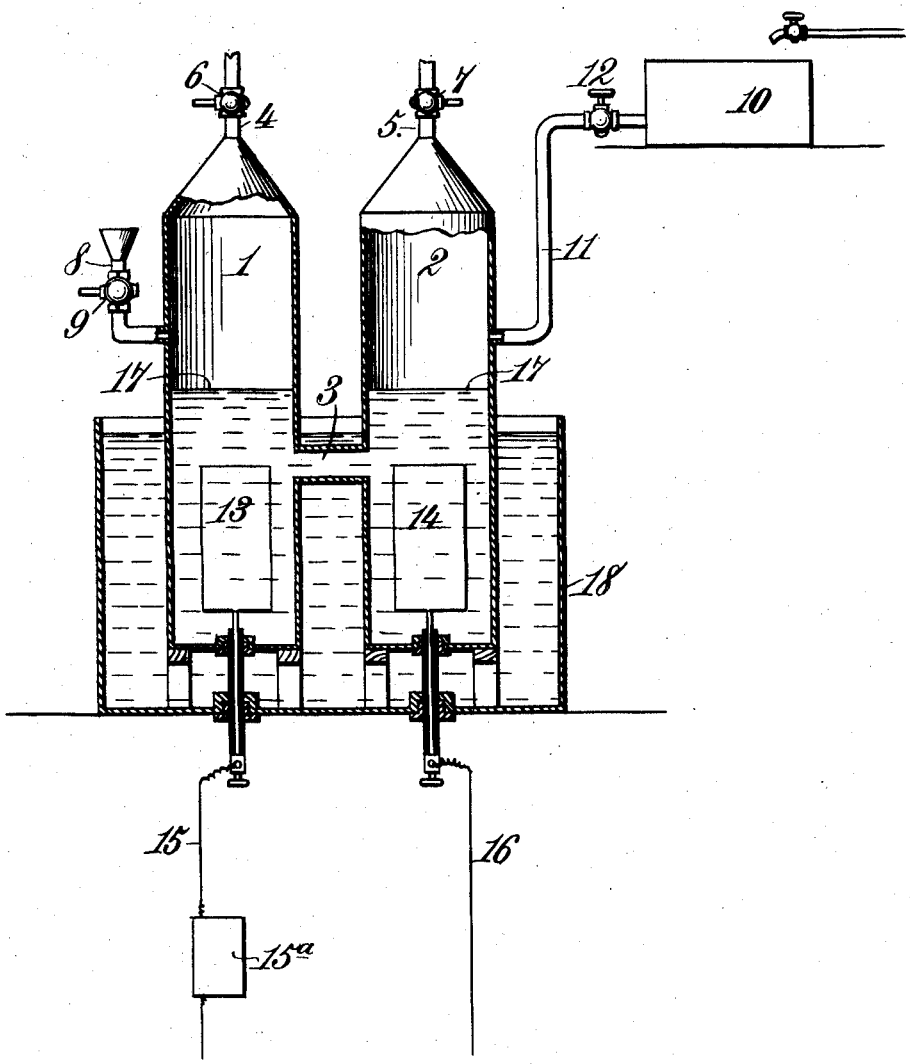
Witnesses.
Robert Everett
Inventor,
William F. Mason McCarty.
By James L. Norris
Atty.

No. 736,868.	Patented August 18, 1903.

UNITED STATES PATENT OFFICE.

WILLIAM F. MASON McCARTY, OF ROCKYRIDGE, MARYLAND, ASSIGNOR OF ONE-THIRD TO ARTHUR COPPELL, OF NEW YORK, N. Y.

PROCESS OF DECOMPOSING WATER BY ELECTROLYSIS.

SPECIFICATION forming part of Letters Patent No. 736,868, dated August 18, 1903.

Application filed April 22, 1902. Serial No. 104,172. (No specimens.)

*To all whom it may concern:*

Be it known that I, WILLIAM F. MASON McCARTY, a citizen of the United States, residing at Rockyridge, in the county of Frederick and State of Maryland, have invented new and useful Improvements in Processes of Decomposing Water by Electrolysis, of which the following is a specification.

My invention relates to a novel process of decomposing water by electrolysis; and it consists in effecting the decomposition of the water into its elements, hydrogen and oxygen, in an economical manner by adding a certain proportion of substances to the water, whereby its electrolytic power is greatly increased. In other words, by the addition of the proportion of chemicals hereinafter specified the water is rendered more susceptible to the action of an electric current, is consequently more rapidly decomposed, and offers less resistance to the current than is the case where water in its natural state is employed as an electrolyte.

In proceeding according to my invention I add to the water, placed in a suitable apparatus, tartrate of potassium, tartrate of soda, or any of the citrates or other equivalents, and sulfuric acid, after which an electric current is passed through suitable electrodes submerged in the water and a rapid and continuous decomposition of the water ensues, oxygen being given off at the anode and hydrogen at the cathode, as well known.

The proportions to be dissolved are substantially as follows: To each ton of two thousand pounds of water I add one pound each of potassium tartrate and soda tartrate. After these have thoroughly dissolved I add sufficient sulfuric acid of 66° Baumé to make the water a one five-hundredths solution.

In order that my invention may be more readily understood, I have illustrated in the accompanying drawing a sectional view of an apparatus for carrying out the process according to my invention.

Referring to the drawing, 1 2 indicate, respectively, two tanks, which are connected about centrally of their height by means of a conduit or pipe 3, affording communication between the two tanks. Each of the tanks has an outlet 4 5, respectively, at its top, controlled by valves 6 7, which outlets are for the escape of the gases. 8 indicates an inlet controlled by a valve 9 for supplying the sulfuric acid to the water in the tanks 1 2. 10 is a water-supply tank communicating, by means of a pipe 11, with one of the tanks. A valve 12 is arranged in said pipe for controlling the supply of water to the tanks. Suitably supported in each tank 1 2 is an electrode 13 14, respectively, of platinum, 13 being the anode, and 14 the cathode.

In the initial procedure, tartrate of soda and tartrate of potash in the proportions named are added to the water in the tank 10 and allowed to dissolve. The water is then allowed to flow into the tanks 1 2 through the pipe 11. Sulfuric acid in the proportion indicated is then supplied to the water through the inlet 8. When the salts come in contact with the sulfuric acid, the water at first gives up a portion of its oxygen to form carbonic-acid gas, which is allowed to escape. This leaves the water more susceptible to the action of the current, which is turned on at the moment of ebullition of the water caused by the decomposition of the salts on the addition of the acid. The current passing through the platinum terminals causes rapid decomposition of the water. The gases of oxygen and hydrogen I recover as liberated at the respective poles. The water having been rendered a high conductor by the addition of the chemicals named, the transmission of the current therethrough from the platinum terminals is greatly facilitated, the electrolyte offers less resistance to the current by reason of the fact that salts have been added to the water, and a rapid decomposition ensues, the gases arising from the respective electrodes and passing out through the outlets 4 5, whence they may be conveyed to suitable holders. When the current is turned on, there is a continual disengagement of the gases from the terminals by the decomposition of the electrolyte under the action of the current in the presence of the salts, the action of the latter on the water rendering it possible to use a current of much less strength than is required where pure water forms the electrolyte. From time to time fresh supplies of the chemicals named may be admitted through the inlet 8 and the requisite amount of water through the pipe 11. The liberation of the gases continues as long as the current is turned on and water is added.

It will be understood, of course, that the current passes through the electrolyte from one terminal to the other by way of the pipe or conduit 3, the upper end of the electrodes 13 14 occupying a plane about coincident with the axis of said pipe or conduit.

The water in the tanks 1 2 must be maintained at about the height indicated by the line 17 17.

As the decomposition of the water occurs with great rapidity, a high degree of heat is generated, and to offset this the apparatus is immersed to about the height shown in a tank 18, supplied with water.

In place of sulfuric I may use other acids, such as tartaric, citric, or acetic acid.

Having thus fully described my invention, what I claim as new is—

1. The process of decomposing water, which consists in adding to the water one pound of an alkali salt to each one thousand pounds of water, and an acid in the proportion of one of acid to five hundred of water, and then subjecting the water to the action of an electric current, and finally separately collecting the oxygen and hydrogen gases evolved.

2. The process of decomposing water which consists in adding one pound of tartrate of soda, one pound of tartrate of potash to each two thousands pounds of water, and sulfuric acid to the water, then subjecting the water to the action of an electric current, and finally separately collecting the oxygen and hydrogen gases evolved.

3. The process of decomposing water, which consists in dissolving one pound of an alkali salt therein to each one thousand pounds of water, then adding sulfuric acid, then subjecting the water to the action of an electric current, and finally collecting the oxygen and hydrogen gases evolved.

4. The process of decomposing water, which consists in dissolving one pound of an alkali salt therein to one thousand pounds of water, and then adding sulfuric acid, and finally subjecting the water to the action of electricity.

5. The process of decomposing water, which consists in dissolving one pound each of tartrate of soda and tartrate of potash therein to about two thousand pounds of water, and then adding sulfuric acid, and finally subjecting the water to the action of an electric current.

In testimony whereof I have hereunto set my hand in presence of two subscribing witnesses.

WILLIAM F. MASON McCARTY.

Witnesses:
BRUCE S. ELLIOTT,
GEO. W. REA.